(12) United States Patent
Meghani et al.

(10) Patent No.: US 9,215,263 B2
(45) Date of Patent: Dec. 15, 2015

(54) METHOD AND APPARATUS FOR RAPID SETUP OF A TELEPHONY COMMUNICATION USING MULTIPLE COMMUNICATION CHANNELS

(71) Applicant: VONAGE NETWORK, LLC, Holmdel, NJ (US)

(72) Inventors: Jaya Meghani, Old Bridge, NJ (US); Mark Wootton, Wall, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/796,429

(22) Filed: Mar. 12, 2013

(65) Prior Publication Data

US 2014/0269674 A1 Sep. 18, 2014

(51) Int. Cl.
*H04L 12/28* (2006.01)
*H04L 29/06* (2006.01)
*H04M 7/00* (2006.01)
*H04M 3/22* (2006.01)

(52) U.S. Cl.
CPC ............ *H04L 65/80* (2013.01); *H04L 65/1069* (2013.01); *H04L 65/1086* (2013.01); *H04L 65/4015* (2013.01); *H04M 7/0057* (2013.01); *H04M 7/0063* (2013.01); *H04M 3/2227* (2013.01)

(58) Field of Classification Search
CPC ...................................................... H04L 47/10
USPC ......... 370/351, 352, 389, 431, 437, 464, 465; 709/227, 228, 238–244
See application file for complete search history.

(56) References Cited

U.S. PATENT DOCUMENTS

| | | | |
|---|---|---|---|
| 8,009,572 B2 * | 8/2011 | Heinla et al. .................. | 370/252 |
| 8,165,011 B2 * | 4/2012 | Ou et al. ........................ | 370/216 |
| 2007/0174399 A1 * | 7/2007 | Ogle et al. .................... | 709/206 |
| 2007/0248077 A1 * | 10/2007 | Mahle et al. .................. | 370/352 |
| 2012/0179829 A1 * | 7/2012 | George ......................... | 709/227 |
| 2012/0188928 A1 * | 7/2012 | Wang et al. ................... | 370/311 |

OTHER PUBLICATIONS

Newton, Telecom Dictionary, CMP Books, 2004, pp. 1, 2 and 142 (total 3 pages).*

* cited by examiner

*Primary Examiner* — Dmitry H Levitan
(74) *Attorney, Agent, or Firm* — Nixon & Vanderhye, P.C.; Joseph Pagnotta (57) ABSTRACT

A first telephony device sets up a first communication channel through an Internet protocol (IP) network for conducting an IP based telephony communication with a second telephony device. The first communication channel includes one or more media relays. The first telephony device then begins to conduct the telephony communication with the second telephony device over the first communication channel. While the initial stages of the telephony communication are ongoing, the first telephony device sets up a second communication channel with the second telephony device that does not utilize media relays. The telephony communication is then switched to the second communication channel. Proceeding in this fashion ensures that a communication channel can be rapidly established between the first and second telephony devices so that the telephony communication can quickly commence.

16 Claims, 7 Drawing Sheets

METHOD AND APPARATUS FOR RAPID SETUP OF A TELEPHONY COMMUNICATION USING MULTIPLE COMMUNICATION CHANNELS

BACKGROUND OF THE INVENTION

The invention is related to Internet Protocol (IP) telephony systems. More specifically, the invention is related to systems and methods for routing the data packets that carry communications enabled by an IP telephony system, such as telephone calls and text or video messages.

Existing IP telephony systems allow users to place and receive telephone calls or to send and/or receive other types of communications, such as text messages, Short Message Service (SMS) messages, Multimedia Messaging Service (MMS) messages and the like. The communications are transmitted, at least in part, by data packets that traverse a private and/or public data network.

For example, a calling party can place a telephone call to a called party using an IP telephony device that is coupled to a private or public data network. When the user requests that the call be placed, an IP telephony system receives the request and assists in setting up the call between the calling party's telephony device and the called party's telephony device. The called party's telephony device can also be an IP telephony device that is coupled to a private or public data network. Alternatively, the called party's telephony device could be an analog telephone that is coupled to a publically switched telephony network (PSTN). In still other instances, the called party's telephony device could be a cellular telephone or a mobile computing device with cellular telephone capabilities that is coupled to a cellular telephony network.

Typically, an IP telephony system receives a call setup request from the calling party's telephony device at a first proxy server (or a session border controller, or an originating gateway). The proxy server consults a routing engine or a routing database to determine the identity of a second proxy server (or session border controller or destination gateway) that is capable of communicating with the called telephony device. The first proxy server passes along the call setup request to the second proxy server. The second proxy server then contacts the called telephony device to attempt to setup the call.

During the call setup, the calling telephony device and the called telephony device are instructed where to send data packets bearing the media of the telephony communication so that those data packets can be delivered to the other telephony device. Often, a media relay is selected, and both the calling and called telephony devices are instructed to send data packets bearing the media of the call to the media relay, and to receive data packets bearing the media of the call from that media relay. In some instances, two or more media relays may be used in a chain fashion to create a communication channel for the data packets to traverse between the calling and called telephony devices.

Once the call has been setup, the called and calling telephony devices send data packets back and forth to each other using the path established during call setup. And this path typically no longer includes the first and second proxy servers. Instead, the path typically includes only one or more media relays that are used to help transmit the data packets between the calling and called telephony devices.

In instances where both the calling telephony device and the called telephony device are IP telephony devices, it may be possible to setup a peer-to-peer communications channel between the calling and called telephony devices which does not include any media relays. However, the first and second proxy servers are still often involved in helping to setup the peer-to-peer communications channel. In particular, the proxy servers can inform the called telephony device of the IP address being used by the calling telephony device, and vice versa. This allows the calling and called telephony device to begin communicating directly with each other so that the telephony devices can establish the peer-to-peer communications channel.

The process of setting up a peer-to-peer communications channel between a calling IP telephony device and a called IP telephony device can be more time consuming than the process of setting up a communications channel which includes a media relay. Often, the two IP telephony devices will need to exchange various pieces of information before a peer-to-peer communications channel can be established. Also, in some instances, one or both of the IP telephony devices may conduct some testing to verify that a potential peer-to-peer communications channel is operational before both devices agree to use the communications channel. This testing can also consume time before a telephony communication using the peer-to-peer communication channel can commence. As a result of these factors, significant delays can occur during call setup if the calling telephony device and called telephony device are attempting to setup a peer-to-peer communication channel.

These setup delays are undesirable, as they can cause user dissatisfaction and frustration. In fact, when a significant delay occurs during call setup, some users will assume that the setup attempt has failed, and they will terminate the setup attempt while the setup attempt is ongoing. This can lead not only to user dissatisfaction, but also lost revenue for the IP telephony service provider.

On the other hand, the costs incurred by an IP telephony service provider are generally lower if a peer-to-peer communication channel is used, as opposed to a communications channel which includes a media relay. If the IP telephony system owns and runs the media relay, there are costs involved in obtaining the media relay, provisioning it with appropriate software, and maintaining it over time. If a media relay from a third party is used, the IP telephony system must typically pay a fee for using the media relay. For these reasons, an IP telephony system would prefer for communications to be carried over peer-to-peer communications channels.

In view of the above-noted factors, there is a need for systems and methods which can utilize low cost peer-to-peer communications channels for telephony communications, but which can also ensure that the initial call setup procedures are accomplished quickly, so that the telephony communication can commence quickly.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
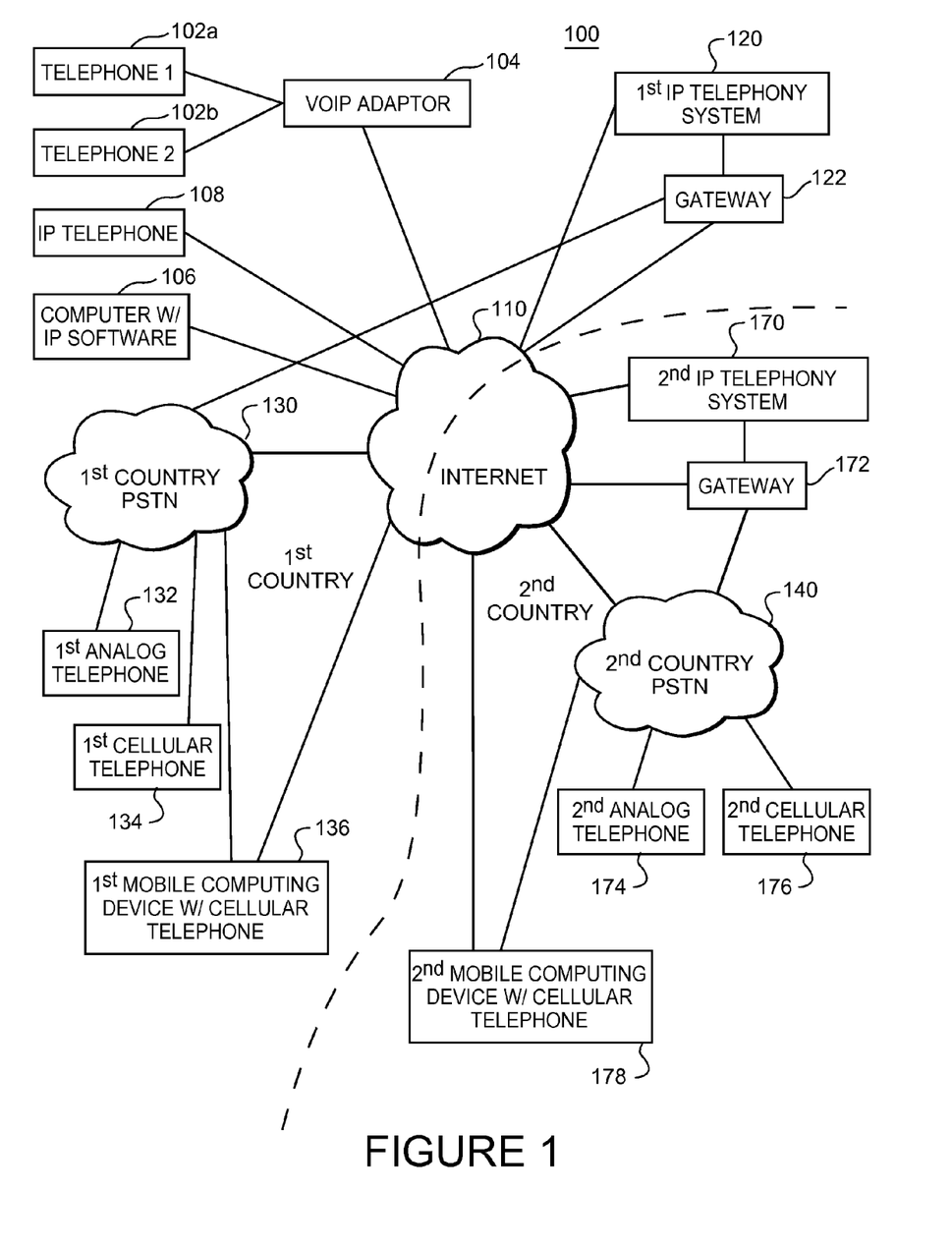
FIG. 1 is a diagram of a communications environment including various elements which are associated with an Internet protocol (IP) telephony system operating in accordance with an embodiment of the invention.

As illustrated in FIG. 1, a communications environment 100 is provided to facilitate IP based communications. A first IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a first publicly switched telephone network (PSTN) 130 and a second PSTN 140 via one or more gateways 122.

The gateway 122 allows users and devices that are connected to the first and second PSTNs 130, 140 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a and 102b could all be coupled to the same telephone adaptor 104. Analog telephone devices include, but are not limited to, standard telephones and document imaging devices such as facsimile machines. A configuration using a telephone adapter 104 is common where all of the analog telephone devices 102a, 102b are located in a residence or business, and all of the telephone devices are connected to the same telephone adapter. With this configuration, all of the analog telephone devices 102a, 102b share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102a, 102b.

A third party using the first analog telephone 132 which is connected to the first PSTN 130 may call a customer of the IP telephony system 120. In this instance, the call is initially connected from the first analog telephone 132 to the first PSTN 130, and then from the first PSTN 130, through the gateway 122 to the first IP telephony system 120. The first IP telephony system 120 then routes the call to the customer's IP telephony device. A third party using the first cellular telephone 134 could also place a call to an IP telephony system customer, and the connection would be established in a similar manner, although the first link would involve communications between the first cellular telephone 134 and a cellular telephone network. For purposes of this explanation, the cellular telephone network is considered part of the first PSTN 130.

In addition, mobile computing devices which include cellular telephone capabilities could also be used to place telephone calls to customers of the IP telephony system. A first mobile computing device 136, as illustrated in FIG. 1, might connect to the first PSTN 130 using its cellular telephone capabilities. However, such devices might also have the ability to connect wirelessly via some other means. For example, the mobile computing device 136 might communicate with a wireless data router to connect the first mobile computing device 136 directly to a data network, such as the Internet 110. In this instance, communications between the first mobile computing device 136 and other parties could be entirely carried by data communications which pass from the first mobile computing device 136 directly to a data network 110. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the first analog telephone 132 or first cellular telephone 134 that is routed through the first PSTN 130 to the first IP telephony system 120 via the gateway 122. This would typically be accomplished by the user calling a local telephone number that is routed to the first IP telephony system 120 via the gateway 122. Once connected to the first IP telephony system 120, the user may then place an outgoing long distance call to anywhere in the world using the first IP telephony system's network. Thus, the user is able place a long distance call using lower cost IP telephony service provided by the first IP telephony system 120, rather than a higher cost service provided by the first PSTN 130.

FIG. 1 also illustrates that a second IP telephony system 170 may interact with the first IP telephony system 120 via the Internet 110. For example, customers of the second IP telephony system 170 may place calls to customers of the first IP telephony system 120. In that instance, assets of the second IP telephony system 170 interact with assets of the first IP telephony system 120 to setup and carry the telephone call. Conversely, customers of the first IP telephony system 120 can place calls to customers of the second IP telephony system 170.

The second IP telephony system could also interact with customers of a second PSTN 140 via a gateway 172. The second PSTN 140 may be connected to a second analog telephone 174, a second cellular telephone 176 and a second mobile computing device 178.

In the following description, we will assume that the first IP telephony system 120, the first PSTN 130, the IP telephone 108, the VOIP adaptor 104, the first analog telephone 132, the first cellular telephone 134 and the first mobile computing device 136 are all located in a first country. Also, the second IP telephony system 170, the second PSTN 140, the second analog telephone 174, the second cellular telephone 176 and the second mobile computing device 178 are all located in a second country.

Figure 2:
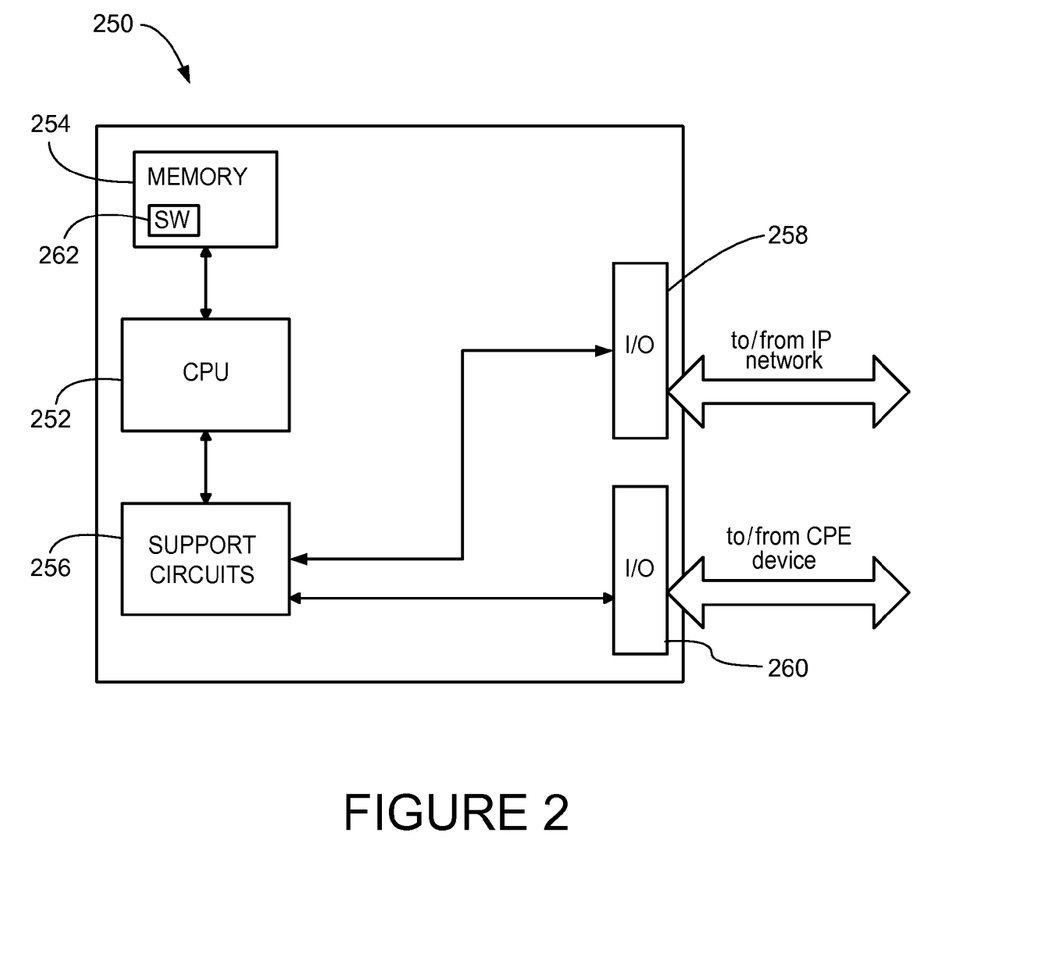
FIG. 2 is a diagram of various elements of a processor that forms part of an IP telephony system.

FIG. 2 illustrates elements of a computer processor 250 that can be used as part of the first or second IP telephony systems 120, 170 to accomplish various functions. Each of the IP telephony systems 120, 170 could include multiple processors 250 located at various locations in the system, along with their operating components and programming, each carrying out a specific or dedicated portion of the functions performed by the IP telephony systems 120, 170.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
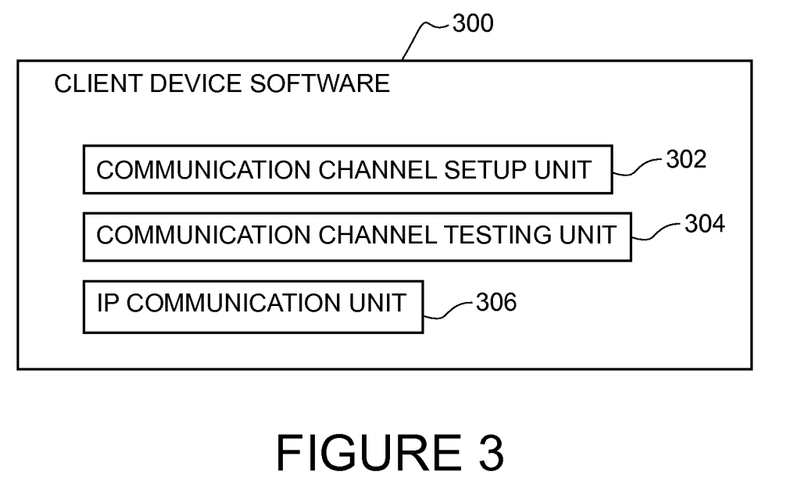
FIG. 3 is a block diagram illustrating elements of software which can be run on an IP telephony device to setup and conduct a telephony communication with another telephony device.

FIG. 3 illustrates elements of a software application that may be run on a telephony device to accomplish various functions, as described in detail below. The software application 300 includes a communication channel setup unit 302, a communication channel testing unit 304, and an IP communication unit.

Figure 4:
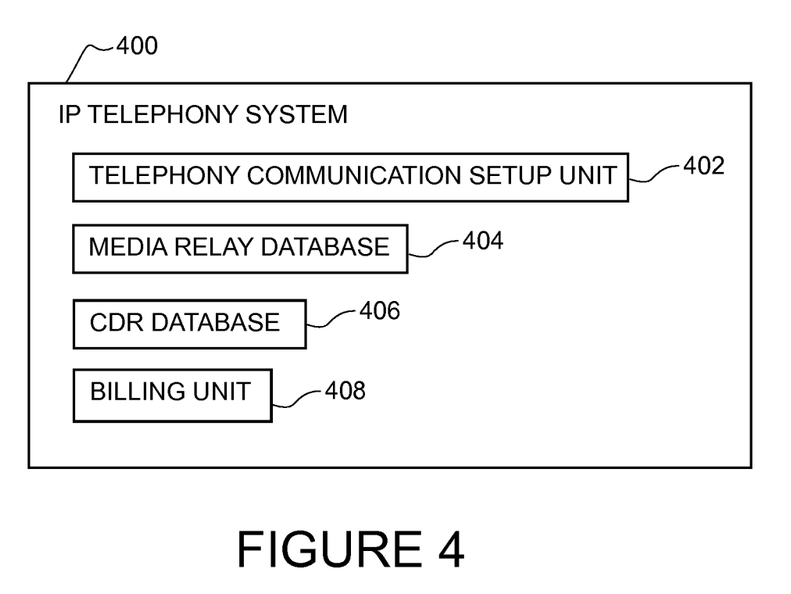
FIG. 4 is a diagram illustrating selected elements of an IP telephony system which includes a telephony communication setup unit in accordance with an embodiment of the invention that assists telephony devices in setting up communication channels.

FIG. 4 illustrates selected elements of an IP telephony system 400 which performs various functions in accordance with the invention. The IP telephony system 400 would include other elements in addition to those illustrated in FIG. 4. FIG. 4 shows that the IP telephony system 400 includes a telephony communication setup unit 402, a media relay database 404, a Call Detail Record (CDR) database 406, and a billing unit 408. A detailed description of how these elements of the IP telephony system 400 interact with telephony devices and elements of a data network to set up and route telephony communications is provided below.

As explained in the background section above, during call setup procedures, a telephony communication setup unit 402 of an IP telephony system can inform the calling telephony device and the called telephony device of a communication channel which can be used to transmit and receive data packets containing the media of the telephony communication. The called telephony device and the calling telephony device then route data packets bearing the media of the telephony communication through the identified communication channel.

A communication channel can include one or more media relays. The IP telephony system may select a particular media relay to be used as part of a communication channel based on the proximity of the media relay to the called and/or calling telephony devices, based on historical data about the quality that the media relay typically offers, based on the cost of using the media relay, and based on a variety of other considerations.

In the following embodiments, one or more media relays which form part of a communication channel between two telephony devices are illustrated as being a part of an IP telephony system. However, in alternate embodiments, the media relays which form all or part of a communication channel can be owned and controlled by third parties. Also, some communication channels could include one or more media relays which are part of an IP telephony system, as well as one or more media relays which are owned and/or controlled by a third party. Thus, the illustration of the media relays as being part of the IP telephony system should in no way be considered limiting.

A description of how telephony communication channels are setup and used to conduct a telephony communication between first and second telephony devices will now be provided with reference to FIGS. 5-8. The basic concept is to use a first communication channel that includes a media relay to begin the telephony communication. Once the telephony communication commences using the first communication channel, the first and second telephony devices attempt to setup a second communication channel which does not make use of any media relays, such as a peer-to-peer communication channel. If a quality second communication channel that does not utilize media relays can be established between the first and second telephony devices, the telephony communication is switched from the first communication channel to the second communication channel.

Operating in this fashion allows a telephony communication to be quickly established, because setting up a communication channel with a media relay is usually fast and easy. Because the telephony communication is quickly established, there is no problem with user dissatisfaction due to setup delays. This also ensure that the IP telephony system will not lose out on revenue, as can occur if a customer becomes frustrated with a delayed setup and terminates a communication before a communication channel is ever established. In addition, by moving the telephony communication to a communication channel that does not utilize media relays, such as a peer-to-peer communication channel, the IP telephony system can minimize the cost of providing the service.

Figure 5:
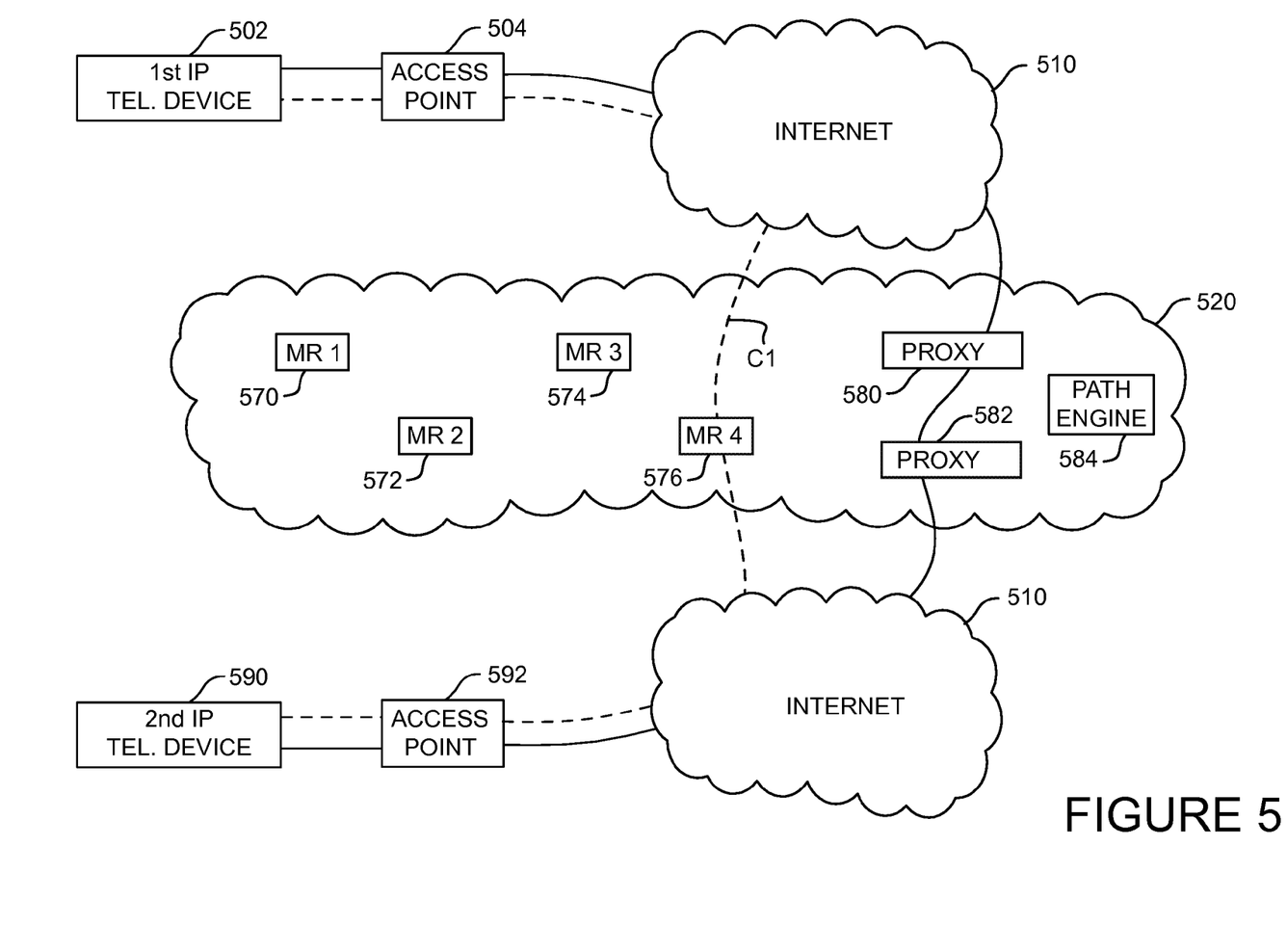
FIG. 5 is a diagram illustrating the path traversed by telephony communication setup signaling and a first communication channel including a media relay which is used to carry data packets bearing the media of a telephony communication in accordance with an embodiment of the invention.

FIG. 5 illustrates the paths taken by setup signaling and by data packets bearing the media of a telephony communication when the telephony communication is first established. The solid lines in FIG. 5 illustrate the path traversed by data packets bearing setup signaling when the telephony communication is originally setup, and possibly also when the telephony communication is being terminated. The dashed lines in FIG. 5 illustrate a first communication channel C1 which carries data packets bearing the media of at least a portion of the telephony communication.

Figure 8:
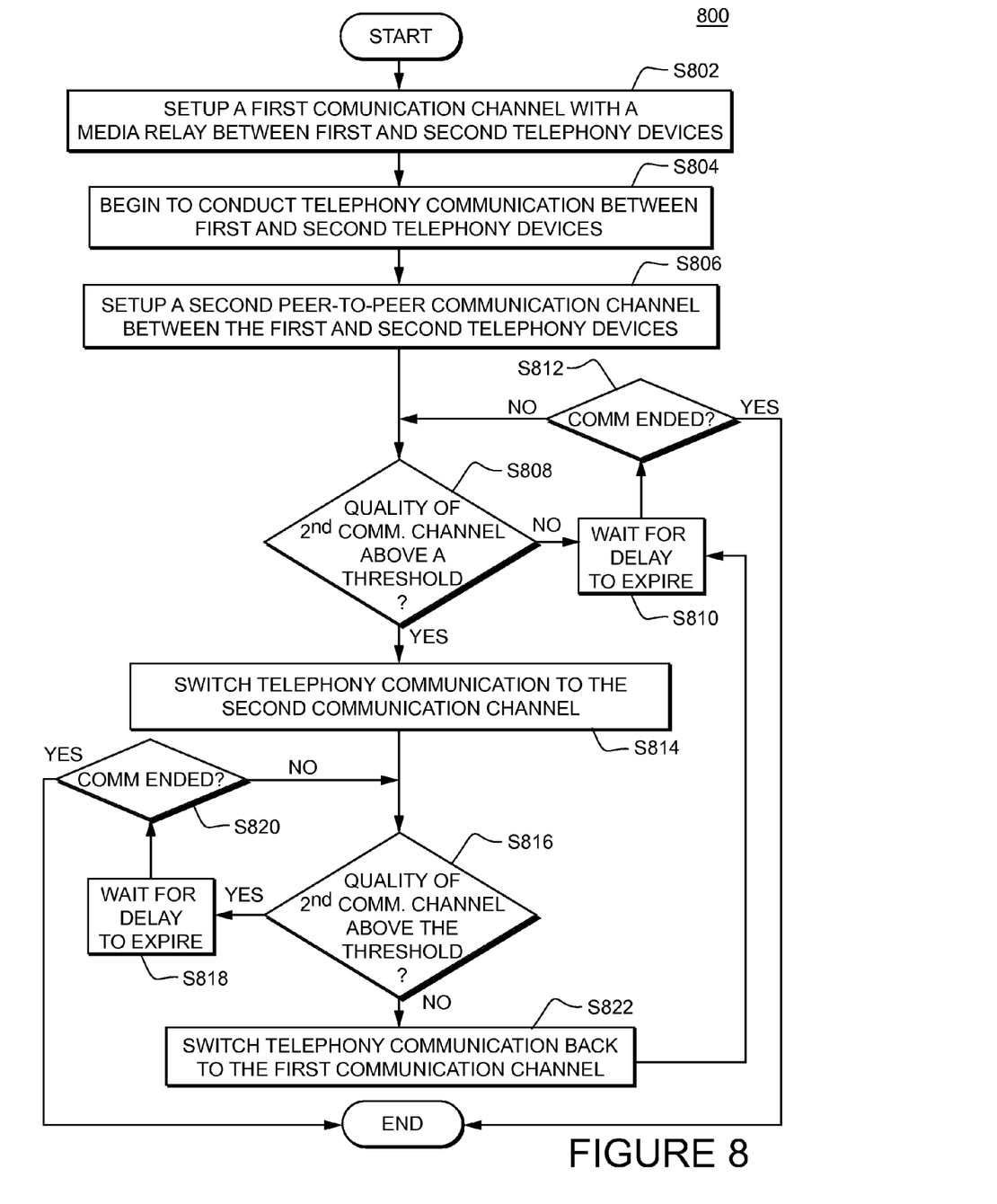
FIG. 8 is a flow diagram illustrating steps of a method of setting up and using communications channels to conduct a telephony communication in accordance with an embodiment of the invention.

As shown in FIG. 5, a first IP telephony device 502 is attempting to set up and conduct a telephony communication with a second IP telephony device 590. The first IP telephony device 502 sends a telephony communication setup request to a first proxy server 580 of an IP telephony system 520 via an access point 504 and the Internet 510. When the first proxy server 580 receives the setup request from the first IP telephony device 502, it locates a second proxy server 582 which is capable of communicating with the second IP telephony device 590. The first proxy server 580 then forwards the setup request to the second proxy server 582. The second proxy server 582 sends the setup request through the Internet 510 and a second access point 592 to the second IP telephony device 590. At this point, a software application on the first IP telephony device 502 and/or the second IP telephony device 590 begins to perform a method 800 as illustrated in FIG. 8. For purposes of the following discussion, we will assume that the second IP telephony device 590 is performing the method 800.

The method 800 begins and proceeds to step S802 after the second IP telephony device 590 receives the telephony communication setup request from the second proxy server 582. In step S802, the second IP telephony device 590 sets up a first communication channel between itself and the first IP telephony device 502. As illustrated in FIG. 5, several media relays can be used to setup such a communication channel. The media relays include a first media relay 570, a second media relay 572, a third media relay 574 and a fourth media relay 576. In this instance, the communication channel setup unit 302 of software on the second IP telephony device 590 sets up the first communication channel C1 using the fourth media relay 576.

The setup signaling that the second IP telephony device 590 received from the second proxy server 582 could include information identifying the fourth media relay 576 as the media relay to be used for the first communication channel C1. In alternate embodiments, the communication channel setup unit 302 of the second IP telephony device 590 may consult with a telephony communication setup unit 402 or a media relay database 404 of an IP telephony system to determine which media relay should be used for the first communication channel. Also, the first communication channel could include more than one media relay.

Figure 6:
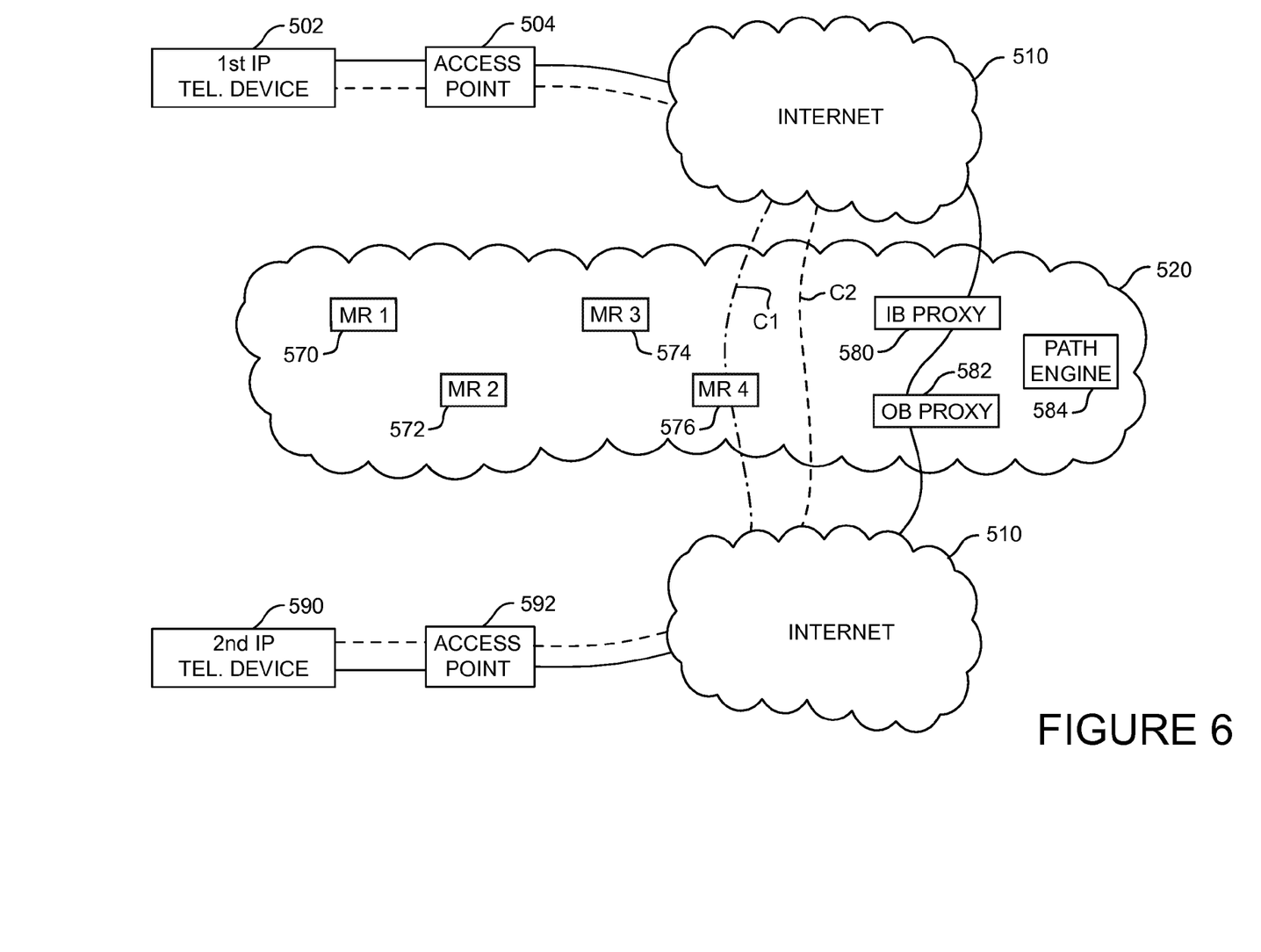
FIG. 6 is a diagram illustrating the path traversed by telephony communication setup signaling and first and second communication channels which can be used to carry data packets bearing the media of a telephony communication in accordance with an embodiment of the invention.
Figure 7:
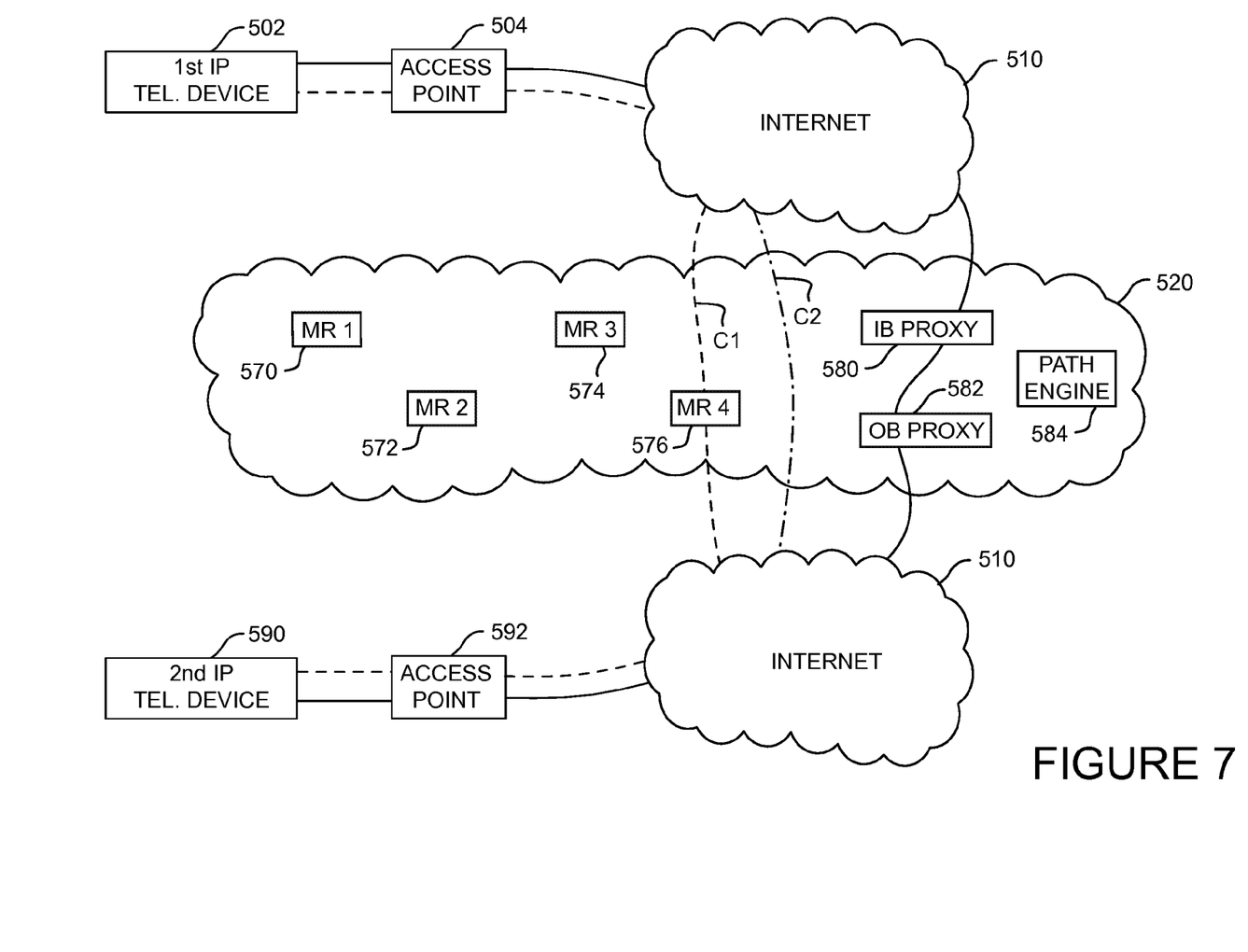
FIG. 7 is another diagram illustrating the path traversed by telephony communication setup signaling and first and second communication channels which can be used to carry data packets bearing the media of a telephony communication in accordance with an embodiment of the invention.

The media relay(s) that is/are selected for the first communication channel could also be determined using systems and methods as described in co-pending U.S. patent application Ser. No. 13/690,052, which was filed Nov. 30, 2012, the entire content of which is hereby incorporated by reference. For example, the selection of media relays can be assisted by a path engine 584 as shown in FIGS. 5-7.

The method 800 then proceeds to step S804, wherein the IP communication units 306 of the first IP telephony device 502 and the second IP telephony device 590 begin the telephony communication. This involves sending and receiving data packets bearing the media of the telephony communication via the first communication channel C1. As explained above, because the first communication channel is established using one or more media relays, the first communication channel can be rapidly setup, and the telephony communication can begin quickly.

At step S806, the communication channel setup unit 302 of the second IP telephony device 590 attempts to setup a second communication channel with the first IP telephony device 502. The second communication channel can be a peer-to-peer communication channel that does not make use of any media relays. The telephony communication between the first IP telephony device 502 and the second IP telephony device 590 continues over the first communication channel C1 while an attempt is made to setup the second peer-to-peer communication channel C2.

The second IP telephony device 590 and the first IP telephony device 502 could communicate directly with each other to setup the second peer-to-peer communication channel C2. The communication channel setup attempt could be conducted in multiple different ways. For example, the first IP telephony device 502 and the second IP telephony device 590 could utilize the Interactive Connectivity Establishment (ICE) protocol, as explained in detail in IETF RFC 5245, by Jonathan Rosenberg, published Apr. 1, 2010, the contents of which are hereby incorporated by reference. Alternatively, the first IP telephony device 502 and the second IP telephony device 590 could perform methods as described in co-pending U.S. patent application Ser. No. 13/236,065, which was filed on Sep. 19, 2011, the entire contents of which is hereby incorporated by reference.

Regardless of the method used, the second IP telephony device 590 establishes a second communication channel via peer-to-peer connection methodologies with the first IP telephony device 502 in step S806 of the method 800. At step S808, a communication channel testing unit 304 of the second IP telephony device 590 determines whether a quality of the second (peer-to-peer) communication channel C2 is above a threshold level.

The quality of a communication channel refers generally to the ability of the communication channel to transmit data packets quickly, in sequential order, and without losses. Traditional measures of quality include the rate at which data packets can be communicated along a communication channel, the average time delay in getting data packets between two points, the number of packets that are lost, and jitter, which is a measure of the variability of the transmission delays which may be experienced by individual data packets. These measures and others may be combined in some fashion to provide an overall quality measure of a communication channel.

The quality of a particular communication channel may also be determined based, at least in part, on a calculated mean opinion score (MOS). Although a MOS can be calculated subjectively by human test personnel, software has also been developed to automatically calculate a MOS for telephony communications that pass over a communication channel. The calculated MOS may be taken into account, along with other factors, to determine the overall quality offered by a communication channel.

Also, a perceptual evaluation of speech quality (PESQ) score may be calculated for a communication channel. Various standards and software exists to compute a PESQ score for a telephony communication passing along a communication channel. The PESQ score for a communication channel may be used, along with the other measures described above, to determine the overall quality of a particular communication channel.

The testing which is conducted in step S808 could be conducted by the communication channel testing unit 304 of the second IP telephony device 590 alone, or in conjunction with the communication channel testing unit 304 of the first IP telephony device 502. This testing may also be conducted with the aid of other elements, including elements of the IP telephony system 520.

If a determination is made in step S808 that the quality of the second communication channel C2 is not above the threshold level, the method proceeds to step S810, and a delay period is allowed to expire. The method then proceeds to step S812, where a determination is made as to whether the telephony communication has been terminated. If so, the method ends. If not, the method loops back to step S808 and another check is performed to determine if the quality of the second communication channel C2 has yet risen above the threshold level. Steps S808, S810 and S812 will continue to repeat until the communication ends, or until the quality of the second communication channel C2 rises above the threshold level. While these steps are being performed, the telephony communication will continue between the first telephony device 502 and the second telephony device 590 over the first communication channel C1, which utilizes the fourth media relay 576.

If the determination made in step S808 indicates that the quality of the second communication channel C2 is above the threshold level, the method proceeds to step S814, where the data packets bearing the media of the telephony communication are switched from the first communication channel C1 to the second communication channel C2. However, the first communication channel C1 is kept open and available. This may be accomplished by periodically sending data packets along the first communication channel C1 to keep the first communication channel C1 open and active. FIG. 6 illustrates the paths taken after the data packets bearing the media of the telephony communication have been switched to the second communication channel C2. The line composed of alternating dashes and dots in FIG. 6 represents that the first communication channel C1 is no longer carrying the data packets bearing the media of the telephony communication, but that the first communication channel C1 is being kept open and available.

At step S816, additional testing is performed to determine if the quality of the second (peer-to-peer) communication channel C2 is still above the threshold level. If so, the method proceeds to step S818, and a delay period is allowed to elapse. The method then proceeds to step S820, where a check is performed to determine if the telephony communication has been terminated. If so, the method ends. If not, the method returns to step S816, and another check is performed to determine if the quality of the second (peer-to-peer) communication channel is above the threshold level. Steps S816, S818 and S820 will continue to repeat until the telephony communication is terminated, or until the quality of the second peer-to-peer communication channel C2 is determined to have fallen below the threshold level.

While steps S816, S818 and S820 are repeating, data packets bearing the telephony communication will be exchanged between the first telephony device 502 and the second telephony device 590 over the second (peer-to-peer) communication channel C2. As described above, routing the data packets in this fashion is generally less expensive for the IP telephony system than routing the data packets via the first communication channel C1, which includes a media relay.

If one of the checks performed in step S816 determines that the quality of the second communication channel C2 has fallen below the threshold level, the method proceeds to step S822, and the data packets bearing the media of the telephony communication are switched back to the first (media relay based) communication channel C1. Because the first communication channel C1 was held open, the data packets can be rapidly switched from the second peer-to-peer communication channel C2 back to the first communication channel C1. Although this will increase the cost of carrying the communication, this also ensures that the telephony communication is conducted with at least a minimum level of quality. The method then proceeds back to step S810, and the flow continues as described above.

FIG. 7 illustrates the paths taken once the data packets bearing the media of the telephony communication have been switched back to the first communication channel C1. As shown therein, the dashed line along first communication channel C1 indicates that the first communication channel is carrying the data packets bearing the media of the telephony communication. The line composed of alternating dashes and dots along the second (peer-to-peer) communication channel C2 indicates that the second communication channel C2 is being held open and available. If the quality of the second communication channel C2 rises back above the threshold quality level, the data packets bearing the media of the telephony communication can be switched back onto the second communication channel C2.

A method as described above, and as illustrated in FIG. 8 ensures that a new telephony communication can be quickly established between two telephony devices. Provided a peer-to-peer based communication channel having acceptable quality can be established between the telephony devices after the telephony communication has begun, the data packets bearing the telephony communication can be switched to the lower cost peer-to-peer based communication channel. The method also ensures that the quality of the telephony communication will always remain above a predetermined threshold level, because the telephony communication can always be switched back to the first communication channel.

In alternate embodiments, once the data packets bearing the telephony communication have been switched to a peer-to-peer communication channel, the media relay based communication channel could be deactivated. In this instance, it may not be possible to switch back to a communication channel that includes a media relay.

In still other embodiments, the first media relay based communication channel could be deactivated once the data packets bearing the telephony communication have been switched to a peer-to-peer communication channel. However, if the quality of the peer-to-peer communication channel becomes poor, a new communication channel that includes a media relay could be established between the first and second IP telephony devices, and the data packets bearing the media of the telephony communication could be switched to the new communication channel. The media relay used in the new communication channel could be the same media relay that was used in the first communication channel, or a different media relay.

In the method described above, testing is periodically conducted to determine if the quality of the peer-to-peer communication channel is above a threshold level. In alternate embodiments, once the data packets have been switched to the peer-to-peer communication channel, no further testing of the peer-to-peer communication channel is conducted, and the telephony communication will continue to be carried over the peer-to-peer communication channel until the telephony communication is terminated.

Also, in the method described above, testing is conducted to determine if the quality of the peer-to-peer communication channel is above a threshold level before the data packets bearing the media of the telephony communication are switched to the peer-to-peer communication channel. In alternate embodiments, the quality of the peer-to-peer communication channel might never be tested, and the data packets bearing the media of the telephony communication may be switched from the media relay based communication channel to the peer-to-peer based communication channel as soon as it is established. The telephony communication would continue to be carried over the peer-to-peer based communication channel until the telephony communication is terminated.

In the methods described above, it was assumed that only a single stream of data packets would contain all of the media of the telephony communication, and that stream of data packets would traverse only one communication channel at any given time. However, in some embodiments, two streams of data packets may be used together to conduct the telephony communication. For example, if the telephony communication is a video call, a first stream of data packets could convey the audio of the communication, while a second stream of data packets could convey the video of the communication. Each stream of data packets could be sent via its own communication channel.

In instances where two streams of data packets are used to conduct a telephony communication, each stream could be treated as described above. In other words, each stream of data packets could be switched between first and second communication channels. Alternatively, one stream of data packets could traverse only a single communication channel, while the second communication stream could be moved from a first communication channel to a second communication channel after the communication has been established.

In many of the foregoing descriptions, a software application running on a telephony device performs various functions. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

In the embodiments discussed above, a first IP telephony device is seeking to setup a telephony communication with a second IP telephony device. However, the systems and methods described above are equally applicable to situations where a first IP telephony device is attempting to setup a telephony communication with an analog or cellular telephone. In those instances, the first IP telephony device would be sending data packets bearing the media of the telephony communication to a gateway or another similar device which acts as an interface between an IP telephony system and the PSTN or a cellular network. The systems and methods discussed above could still be used to communicate data packets bearing the media of the telephony communication between the interface gateway and the first IP telephony device.

Also, although many of the examples provided about related to telephony communications, those telephony communications could be audio or video calls, or other forms of telephony communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for setting up and using communication channels that allow a first telephony device to conduct a telephone call with a second telephony device in an Internet protocol (IP) environment, the method comprising:
   establishing a communication setup path, using a proxy server, between the first telephony device and the second telephony device;
   setting up a first communication channel between the first telephony device and the second telephony device using at least one media relay based on information received from the proxy server;
   conducting at least an initial portion of the established and now ongoing telephone call via the first communication channel;
   setting up a second communication channel between the first and second telephony devices using peer-to-peer based communication; and
   switching the ongoing telephone call from the first communication channel to the second communication channel while maintaining connectivity between the first and second telephony devices over the first communication channel.

2. The method of claim 1, further comprising:
   determining a quality of the second communication channel while the initial portion of the telephone call is ongoing; and
   switching the ongoing telephone call from the first communication channel to the second communication channel if the determined quality of the second communication channel is above a threshold level such that at least a portion of the telephone call is conducted via the second communication channel.

3. The method of claim 2, further comprising keeping the first communication channel open and available after the ongoing telephone call is switched to the second communication channel.

4. The method of claim 3, further comprising:
   determining if a quality of the second communication channel falls below a threshold level after the ongoing telephone call has been switched to the second communication channel; and
   switching the ongoing telephone call back to the first communication channel if the quality of the second communication channel is determined to have fallen below the threshold level.

5. The method of claim 1, wherein the step of setting up a second communication channel comprises communicating with the second telephony device while the initial portion of the ongoing telephone call is being conducted to obtain information which is used to setup the second communication channel.

6. The method of claim 1, wherein the ongoing telephone call is an ongoing audio or video telephone call.

7. The method of claim 1, wherein a minimal amount of connectivity between the first and second telephony devices over the first communication channel is maintained.

8. The method of claim 1, wherein connectivity is maintained over the first communication channel by periodically sending data packets along the first communication channel.

9. A system for setting up and using communication channels that allow a first telephony device to conduct a telephone call with a second telephony device in an Internet protocol (IP) environment, comprising:
   means for establishing a communication setup path, using a proxy server, between the first telephony device and the second telephony device and for setting up a first communication channel between the first telephony device and the second telephony device using at least one media relay based on information received from the proxy server;
   means for conducting at least an initial portion of the established and now ongoing telephone call via the first communication channel;
   means for setting up a second communication channel between the first and second telephony devices using peer-to-peer based communication; and
   means for switching the ongoing telephone call from the first communication channel to the second communication channel while maintaining connectivity between the first and second telephony devices over the first communication channel.

10. The system of claim 9, wherein the ongoing telephone call is an ongoing audio or video telephone call.

11. A system for setting up and using communication channels that allow a first telephony device to conduct a telephone call with a second telephony device in an Internet protocol (IP) environment, comprising:
   a communication channel setup unit that establishes a communication setup path, using a proxy server, between the first telephony device and the second telephony device and sets up a first communication channel between the first telephony device and the second telephony device using at least one media relay based on information received from the proxy server, wherein the communication channel setup unit also sets up a second communication channel between the first and second telephony devices using peer-to-peer based communication; and
   an IP communication unit that conducts at least an initial portion of the established and now ongoing telephone call via the first communication channel,
   the IP communication unit configured to switch the ongoing telephone call from the first communication channel to the second communication channel while maintaining connectivity between the first and second telephony devices over the first communication channel.

12. The system of claim 11, further comprising a communication channel testing unit that determines a quality of the second communication channel while the initial portion of the telephone call is ongoing, wherein the IP communication unit switches the ongoing telephone call from the first communication channel to the second communication channel if the determined quality of the second communication channel is above a threshold level such that at least a portion of the ongoing telephone call is conducted via the second communication channel.

13. The system of claim 12, wherein the communication channel setup unit keeps the first communication channel open and available after the ongoing telephone call is switched to the second communication channel.

14. The system of claim 13, wherein the communication channel testing unit determines if a quality of the second communication channel falls below a threshold level after the ongoing telephone call has been switched to the second communication channel, and wherein the IP communication unit switches the ongoing telephone call back to the first communication channel if the quality of the second communication channel is determined to have fallen below the threshold level.

15. The system of claim 11, wherein the communication channel setup unit sets up the second communication channel by communicating with the second telephony device while the initial portion of the ongoing telephone call is being conducted to obtain information which is used to setup the second communication channel.

16. The system of claim 11, wherein the ongoing telephone call is an ongoing audio or video telephone call.

* * * * *